(12) United States Patent
Nesher et al.

(10) Patent No.: US 10,394,154 B2
(45) Date of Patent: Aug. 27, 2019

(54) ELECTROPHOTOGRAPHIC COMPOSITION

(71) Applicant: HP Indigo B.V., Amstelveen (NL)

(72) Inventors: Guy Nesher, Ness Ziona (IL); Shahar Stein, Ness Ziona (IL); Yaron Grinwald, Ness Ziona (IL)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 15/568,867

(22) PCT Filed: Jul. 17, 2015

(86) PCT No.: PCT/EP2015/066465
§ 371 (c)(1),
(2) Date: Oct. 24, 2017

(87) PCT Pub. No.: WO2017/012641
PCT Pub. Date: Jan. 26, 2017

(65) Prior Publication Data
US 2018/0143558 A1 May 24, 2018

(51) Int. Cl.
| G03G 9/125 | (2006.01) |
| G03G 9/135 | (2006.01) |
| G03G 9/12 | (2006.01) |
| G03G 9/13 | (2006.01) |
| C08L 23/06 | (2006.01) |
| C08L 33/08 | (2006.01) |
| C08L 33/10 | (2006.01) |

(52) U.S. Cl.
CPC .............. *G03G 9/125* (2013.01); *G03G 9/12* (2013.01); *G03G 9/122* (2013.01); *G03G 9/131* (2013.01); *G03G 9/135* (2013.01); *C08L 23/06* (2013.01); *C08L 33/08* (2013.01); *C08L 33/10* (2013.01)

(58) Field of Classification Search
CPC ........ G03G 9/125; G03G 9/135; G03G 9/131; G03G 9/12; G03G 9/122; C08L 33/08; C08L 33/10; C08L 23/06
See application file for complete search history.

(56) References Cited

U.S. PATENT DOCUMENTS

| 5,324,444 A | 6/1994 | Berry et al. |
| 5,521,046 A | 5/1996 | Materazzi |
| 5,885,701 A | 3/1999 | Berman et al. |
| 2008/0233313 A1* | 9/2008 | Chatow ................ B41M 5/0023 428/30 |
| 2011/0217650 A1* | 9/2011 | Mor ........................ C09D 11/03 430/115 |

FOREIGN PATENT DOCUMENTS

| CN | 101121835 | 2/2008 |
| CN | 102850845 | 1/2013 |
| CN | 103149811 | 6/2013 |
| DE | 202011105001 | 11/2011 |
| EP | 1416023 | 5/2004 |
| JP | 2009155400 | 7/2009 |
| WO | 0079346 | 12/2000 |

OTHER PUBLICATIONS

International Search Report and Written Opinion dated Mar. 15, 2016 for PCT/EP2015/066465; Applicant Hewlett-Packard Indigo B.V.

* cited by examiner

*Primary Examiner* — Thorl Chea
(74) *Attorney, Agent, or Firm* — HP Inc. Patent Department

(57) ABSTRACT

This disclosure relates to an electrophotographic composition comprising toner particles dispersed in a liquid carrier. The toner particles comprise porous carrier particles infused with a fragrance.

20 Claims, No Drawings

ELECTROPHOTOGRAPHIC COMPOSITION

BACKGROUND

An electrophotographic printing process involves creating an image on a photoconductive surface or photo imaging plate (PIP). The image that is formed on the photoconductive surface is a latent electrostatic image having image and background areas with different potentials. When an electrophotographic ink composition containing charged toner particles is brought into contact with the selectively charged photoconductive surface, the charged toner particles adhere to the image areas of the latent image while the background areas remain clean. The image is then transferred to a print substrate (e.g. paper) either directly or by first being transferred to an intermediate transfer member (e.g. a soft swelling blanket) and then to the print substrate.

DETAILED DESCRIPTION

Before the present disclosure is disclosed and described, it is to be understood that this disclosure is not limited to the particular process steps and materials disclosed in this disclosure because such process steps and materials may vary. It is also to be understood that the terminology used in this disclosure is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used in this disclosure, "carrier fluid", "carrier liquid," "carrier," or "carrier vehicle" refers to the fluid in which polymers, particles, colorant, charge directors and other additives can be dispersed to form a liquid electrostatic composition or liquid electrophotographic composition. The carrier liquids may include a mixture of a variety of different agents, such as surfactants, co-solvents, viscosity modifiers, and/or other possible ingredients.

As used in this disclosure, "liquid electrophotographic composition" or "liquid electrostatic composition" generally refers to a composition, which is suitable for use in an electrophotographic or electrostatic printing process. The liquid electrophotographic composition may comprise chargeable particles of a resin dispersed in a carrier liquid. The liquid electrophotographic composition may or may not comprise a colorant.

As used in this disclosure, "co-polymer" refers to a polymer that is polymerized from at least two monomers.

As used in this disclosure, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of moulding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used in this disclosure, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used in this disclosure, "melt viscosity" generally refers to the ratio of shear stress to shear rate at a given shear stress or shear rate. Testing may be performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described in this disclosure as constituting a certain weight percentage of a polymer. This indicates that the repeating units formed from the said monomer in the polymer constitute said weight percentage of the polymer.

If a standard test is mentioned in this disclosure, unless otherwise stated, the version of the test to be referred to is the most recent at the time of filing this patent application.

As used in this disclosure, "electrostatic printing" or "electrophotographic printing" refers to the process that provides an image that is transferred from a photo imaging plate either directly or indirectly via an intermediate transfer member to a print substrate. As such, the image may not be substantially absorbed into the photo imaging substrate on which it is applied. Additionally, "electrophotographic printers" or "electrostatic printers" refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrophotographic printing process may involve subjecting the electrophotographic composition to an electric field, e.g. an electric field having a field gradient of 50-400V/µm, or more, in some examples 600-900V/µm, or more.

As used in this disclosure, a "fragrance" may include a fragrance or perfume oil that is used to impart a scent to the electrophotographic composition. The scent may be designed to provide the printed composition with an olfactory quality or appeal. The scent may provide abstract associations with the text or graphic image printed using the electrophotographic composition of the present disclosure. For example, a printed image of a peach may be scented with a peach fragrance to provide the printed image with both visual and olfactory qualities. Similarly, as another example, a printed image relating to coffee may be scented with a coffee fragrance to provide the printed image with both visual and olfactory appeal. The fragrance may include a fragrance compound, flavour compound and/or mixtures thereof.

As used in this disclosure, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used in this disclosure, "heteroatom" may refer to nitrogen, oxygen, halogens, phosphorus, or sulfur.

As used in this disclosure, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms, for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described in this disclosure may contain, but are not limited to, from 5 to about 50 carbon atoms, or 5 to about 40 carbon atoms, or 5 to 30 carbon atoms or more, and may be selected from, phenyl and naphthyl.

As used in this disclosure, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used in this disclosure, wt % values are to be taken as referring to a weight-for-weight (w/w) percentage of solids in the composition, and not including the weight of any carrier fluid present.

The present disclosure relates to an electrophotographic composition comprising toner particles dispersed in a liquid carrier. The toner particles comprise porous carrier particles infused with a fragrance.

The present disclosure also relates to a method of forming a printed image on a substrate. The method comprises electrophotographically printing an image onto a print substrate using an electrophotographic composition that comprises porous carrier particles infused with a fragrance.

The present disclosure also relates to a print substrate comprising an image formed from at least one layer of an electrophotographic composition printed onto the substrate. The electrophotographic composition comprises porous carrier particles infused with a fragrance.

Fragranced inks and varnishes can be used to form printed images with both visual and olfactory appeal. Smell can be used to provide abstract associations with text content and may be an effective way to personalise text and graphic images. Fragrances, for example fragrance oils, can be added directly the ink or varnish. However, as fragrances tend to be volatile, they evaporate quickly.

Accordingly, printed images formed using such fragrance-containing inks may not provide a discernible fragrance for an adequate length of time. By infusing porous carrier particles with a fragrance, it is possible to retain the fragrance in the electrophotographic composition such that the fragrance is released gradually, allowing the fragrance to be detected over a longer period of time.

The porous carrier particles may comprise particles of any suitable porous carrier. Examples of suitable carriers include carriers formed of silica or a zeolite. The carrier may comprise a structure formed of interconnected pores, for example, as a 3-dimensional network. In one example, the porous carrier particles are particles of fumed silica. The silica may comprise amorphous silica particles that are randomly interconnected in a 3-dimensional network. In one example, the porous carrier particles are hydrophilic. For instance, the porous carrier particles may be particles of hydrophilic silica, for example, hydrophilic fumed silica. Suitable fumed silica particles may be available under the trademark Aerosil®, for example, Aerosil® 300.

The porous carrier particles (e.g. fumed silica particles) may have a specific surface area (BET surface area) of 5 to 1000 $m^2/g$, for example, 50 to 700 $m^2/g$. In some examples, the BET surface area of the porous carrier may be 100 to 500 $m^2/g$, for example, 250 to 400 $m^2/g$.

The porous carrier particles (e.g. fumed silica) may have a pH of 3 to 5, for example, 3 to 4.

The porous carrier particles (e.g. fumed silica particles) may have an average particle size of 1 to 1000 nm, for example, 10 to 500 nm. In some examples, the porous carrier particles have an average particle size of 15 to 200 nm. Examples include porous carrier particles having average particle sizes of 15 nm, 25 nm, 40 nm, 100 nm and/or 200 nm. The average particle size may be a mean, modal and/or median particle size. In one example, the average particle size is a modal particle size. In one example, the porous carrier particles have particle sizes of 5 to 50 nm with an average (e.g. modal) particle size of 15 nm.

The porous carrier particles infused with fragrance may be present in an amount of 0.1 to 50 weight % of the total weight of solids in the composition. In one example, the fragrance-infused porous carrier particles may form 1 to 45 weight %, for instance, 5 to 40 weight % of the total weight of solids in the composition. In one example, the fragrance-infused porous carrier particles may form 10 to 35 weight %, for instance, 15 to 30 weight % of the total weight of solids in the composition.

The porous carrier particles may be infused with fragrance, whereby the weight ratio of fragrance to the porous carrier particles is from 1:2 to 30:1, for example, 1:1 to 20:1.

In one example, the weight ratio of fragrance to porous carrier particles is 5:1 to 15:1, for instance, 8:1 to 10:1.

Any fragrance may be used in the electrophotographic composition of this disclosure. The fragrance may be a chemical compound or a chemical composition that is incorporated into the electrophotographic composition to impart a desired scent or smell to the electrophotographic composition. The scent may be designed to provide the printed composition with olfactory appeal. The scent may provide abstract associations with the text or graphic image printed using the electrophotographic composition of the present disclosure. The fragrance may provide an effective way of personalising text or graphic images printed using the electrophotographic composition. The fragrance may be a fragrance oil or perfume oil. The fragrance may comprise an essential oil. The fragrance may comprise synthetic compounds, natural compounds or a combination thereof. Suitable fragrances may provide a fragrance reminiscent of scents derived from or associated with flowers, fruit, trees, herbs, spices, plant extracts, food flavours and beverages. Examples of fragrance notes include chocolate, vanilla, lemon, orange, jasmine, brandy, peach, pear, apple, mint, lavender, cinnamon, coffee, pine, tea tree, *eucalyptus*, fennel, aniseed, rosemary, thyme and musk. Examples of fragrance compounds include undecanoic-γ-lactone, p-anisaldehyde, anisyl acetate, citronellyl acetate, benzyl propionate and isoamyl laurate.

The liquid electrophotographic ink composition may comprise 0.5 to 15 weight %, for example, 2 to 8 weight % of fragrance based on the total weight of liquid in the composition.

The electrophotographic composition may be prepared by dispersing porous particles in a liquid carrier. The porous carrier particles may first be infused with the fragrance. For example, the porous carrier particles may be contacted (e.g. soaked) in the fragrance or in a composition containing the fragrance for a period of time. The composition containing the fragrance may also contain a solvent, for example, a non-polar solvent. Suitable non-polar solvents include hydrocarbon solvents, for instance, iso-paraffin(s). An example of a non-polar solvent is Isopar™' The porous carrier may be soaked for sufficient time to ensure that a desired amount of fragrance is infused into the carrier. In some examples, this may take 5 minutes or more, for example, 1 hour or more. In some examples, this may take at least 6 hours, for example, at least 12 hours. In some examples, this may take at least 24 hours, for example, up to 48 or 72 hours.

The porous carrier particles may be contacted with the fragrance in a weight ratio of 1:1 to 1:100, for example, 1:5 to 1:30. In one example, the weight ratio is 1:7 to 1:20, for instance, 1:10. The final weight ratio of porous carrier particle to fragrance in the infused particles may be as described above.

Once infused with the fragrance, the porous carrier particles may be mixed with other components of the electrophotographic composition and dispersed in the carrier liquid. For example, the fragrance-infused porous carrier particles may be mixed with thermoplastic resin and/or charge adjuvant. The liquid carrier may also be present in the mixture. In some examples, the fragrance-infused porous carrier particles are ground in the presence of at least one of the thermoplastic resin and carrier liquid and the charge adjuvant. The charge director may then be added.

Polymer Resin

The composition can comprise a polymer resin. The polymer resin may comprise a thermoplastic polymer. A thermoplastic polymer is sometimes referred to as a thermoplastic resin. In one example, the polymer is a polymer of an alkylene (e.g. ethylene) and at least one of methacrylic acid or acrylic acid. In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described in this disclosure. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described in this disclosure. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in the electrophotographic composition comprises a single type of polymer, the polymer (excluding any other components of the electrostatic composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer.

The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic composition, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition. The polymer having ester side groups may constitute from 5% to 50% by weight of the total amount of the resin polymers, e.g. thermoplastic resin polymers, in the liquid electrophotographic composition, in some examples 10% to 40% by weight of the total amount of the resin polymers, e.g. thermoplastic resin polymers, in the liquid electrophotographic composition, in some examples 5% to 30% by weight of the total amount of the resin polymers, e.g. thermoplastic resin polymers, in the liquid electrophotographic composition, in some examples 5% to 15% by weight of the total amount of the resin polymers, e.g. thermoplastic resin polymers, in the liquid electrophotographic composition in some examples 15% to 30% by weight of the total amount of the resin polymers, e.g. thermoplastic resin polymers, in the liquid electrophotographic composition.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™ Nucrel 609HS™, Nucrel 908HS™, Nucrel 1202HC™, Nucrel 30707™ Nucrel 1214™ Nucrel 903™, Nucrel3990™, Nucrel910™, Nucrel925™, Nucrel 699™, Nucrel599™, Nucrel960™, Nucrel RX76™, Nucrel2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the liquid electrophotographic composition. The resin can constitute about 60 to 95%, in some examples about 70 to 95%, by weight of the solids of the liquid electrophotographic composition.

Charge Director

A charge director may be added to the composition. In some examples, the charge director comprises nanoparticles of a simple salt and a salt of the general formula $MA_n$, wherein M is a barium, n is 2, and A is an ion of the general formula $[R_1—O—C(O)CH_2CH(SO_3^-)C(O)—O—R_2]$, where each of $R_1$ and $R_2$ is an alkyl group e.g. as discussed above.

The sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 10 nm or less, in some examples 2 nm or more (e.g. 4-6 nm).

The simple salt may comprise a cation selected from Mg, Ca, Ba, $NH_4$, tert-butyl ammonium, $Li^+$, and $Al^{+3}$, or from any sub-group thereof. In one example, the simple salt is an inorganic salt, for instance, a barium salt. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any sub-group thereof. In some examples, the simple salt comprises a hydrogen phosphate anion.

The simple salt may be selected from $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. In one example, the simple salt may be $BaHPO_4$.

In the formula $[R_1—O—C(O)CH_2CH(SO_3^-)C(O)—O—R_2]$, in some examples, each of $R_1$ and $R_2$ is an aliphatic alkyl group. In some examples, each of $R_1$ and $R_2$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$.

In an electrophotographic composition, the charge director can constitute about 0.001% to 20%, in some examples 0.01 to 20% by weight, in some examples 0.01 to 10% by weight, in some examples 0.01 to 1% by weight of the solids of the electrostatic composition. The charge director can constitute about 0.001 to 0.15% by weight of the solids of the liquid electrophotographic composition, in some examples 0.001 to 0.15%, in some examples 0.001 to 0.02% by weight of the solids of the liquid electrophotographic composition. In some examples, the charge director imparts a negative charge on the electrostatic composition. The particle conductivity may range from 50 to 500 pmho/cm, in some examples from 200-350 pmho/cm.

Charge Adjuvant

The liquid electrophotographic composition can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic composition. The charge adjuvant can constitute about 0.5 to 4% by weight of the solids of the liquid electrophotographic composition. The charge adjuvant can constitute about 1 to 3% by weight of the solids of the liquid electrophotographic composition.

Carrier Liquid

Generally, the carrier liquid for the liquid electrophotographic composition can act as a dispersing medium for the other components in the electrostatic composition. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar G™, Isopar-H™, Isopar-L™, Isopar-M™, Isopar-K™, Isopar-V™, Norpar12™, Norpar 13™, Norpar15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™, and IP Solvent2028™, (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic composition, in some examples 50% to 99.5% by weight of the electrostatic composition. Before printing, the carrier liquid may constitute about 40 to 90% by weight of the electrostatic composition. Before printing, the carrier liquid may constitute about 60% to 80% by weight of the electrostatic composition. Before printing, the carrier liquid may constitute about 90% to 99.5% by weight of the electrostatic composition, in some examples 95% to 99% by weight of the electrostatic composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Colorants

The electrophotographic composition and/or ink printed on the print substrate may further include a colorant. The colorant may be selected from a pigment, dye and a combination thereof. The colorant may be transparent, unicolor or composed of any combination of available colours. The colorant may be selected from a cyan colorant, a yellow colorant, a magenta colorant and a black colorant. The electrophotographic composition and/or ink printed on the print substrate may include a plurality of colorants. The electrophotographic composition and/or ink printed on the print substrate may include a first colorant and second colorant, which are different from one another. Further colorants may also be present with the first and second colorants. The electrophotographic composition and/or ink printed on the print substrate may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

Where present, the colorant may be present in an amount of 0.1 to 10 weight %, for instance, 2 to 5 weight % of the total weight of solids of the composition.

Printing Process and Print Substrate

In some examples, the liquid electrophotographic composition as described in this disclosure is printed onto a substrate using a liquid electrophotographic printer.

In some examples, the surface on which the image is formed or developed may be on a rotating member, e.g. in the form of a cylinder. The surface on which the printed image is formed or developed may form part of a photo imaging plate (PIP). The method may involve passing the composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic composition is printed onto the print substrate.

Various examples will now be described.

EXAMPLE 1

Fumed silica particles (Aerosil® 300) were infused with a fragrance (benzyl propionate) by soaking 20 g of the fumed silica in 200 g of the fragrance and 80 g of Isopar™. The mixture was incubated at room temperature for 24 hours.

The fragrance-infused particles were then mixed with thermoplastic resin, charge adjuvant and Isopar in the amounts shown below.

300 g fragrance-infused particles 720 g of a paste A containing a copolymer of ethylene and methacrylic acid and a copolymer of ethylene and acrylic acid in a weight ratio of 80:20

4 g charge adjuvant 180 g Isopar

The mixture was ground in a ceramic attritor for 6 hours at 40 degrees C. at 250 rpm. The working dispersion was then charged with 12 g of charge director. The resulting ink contained toner particles having an average particle size of 6 microns and a particle conductivity of 104 pmho.

COMPARATIVE EXAMPLE

A comparative composition was prepared using the fragrance in liquid form. In other words, the fragrance was used directly without being infused into porous carrier particles. The following components were mixed in the amounts shown below:

200 g fragrance 720 g Paste A 4 g charge adjuvant 280 g Isopar

The mixture was ground in a ceramic attritor for 6 hours at 40 degrees C. at 250 rpm. The working dispersion was then charged with 12 g of charge director. The resulting ink contained toner particles having an average particle size of 6 microns and a particle conductivity of 104 pmho.

EXAMPLE 3

The inks of Examples 1 and Comparative Example 2 were electrophotographically printed on a print substrate. The fragrance emanating from the printed ink was monitored by olfactory inspection over a period of time. The results are shown in the table below:

| Time after printing | Image printed with composition of Example 1 | Image printed with composition of Example 1 |
|---|---|---|
| 1 day | Strong odour | Strong odour |
| 2 days | Strong odour | Weak odour |
| 3 days | Strong odour | No odour |
| 1 week | Strong odour | No odour |

The invention claimed is:

1. An electrophotographic composition comprising toner particles dispersed in a liquid carrier, wherein the toner particles comprise a polymer resin and porous silica particles infused with a fragrance.

2. The electrophotographic composition as claimed in claim 1, wherein the silica is fumed silica.

3. The electrophotographic composition as claimed in claim 1, wherein the porous silica particles infused with fragrance are present in an amount of 0.1 to 50 weight % of the total weight of solids in the composition.

4. The electrophotographic composition as claimed in claim 1, wherein the porous silica particles have an average particle size of 1-1000 nm and/or a surface area of 5-1000 $m^2/g$.

5. The electrophotographic composition as claimed in claim 1, wherein the porous silica particles are infused with fragrance, whereby the weight ratio of fragrance to the porous silica particles is from 1:2 to 30:1.

6. The electrophotographic composition as claimed in claim 1, wherein the polymer resin is a thermoplastic resin having acidic side groups.

7. The electrophotographic composition as claimed in claim 6, wherein the thermoplastic resin comprises a copolymer of ethylene and either acrylic acid or methacrylic acid.

8. The electrophotographic composition as claimed in claim 1, wherein the composition is an electrophotographic varnish.

9. The electrophotographic composition as claimed in claim 1, wherein the toner particles comprise at least one colorant.

10. The electrophotographic composition as claimed in claim 1, which includes a charge adjuvant.

11. The electrophotographic composition as claimed in claim 1, which includes a charge director.

12. The electrophotographic composition as claimed in claim 3, wherein the polymer resin is a thermoplastic resin having acidic side groups.

13. The electrophotographic composition as claimed in claim 1, wherein the porous silica particles have a pH of 3 to 5.

14. The electrophotographic composition as claimed in claim 1, wherein the porous silica particles have an average particle size of 15 nm to 200 nm.

15. The electrophotographic composition as claimed in claim 1, wherein the polymer resin comprises a co-polymer of ethylene and acrylic or methacrylic acid which is at least partially neutralized with Zn, Na, and/or Li metal ions.

16. A method of forming a printed image on a substrate, said method comprising electrophotographically printing an image onto a print substrate using an electrophotographic composition that comprises a polymer resin and porous silica particles infused with a fragrance.

17. The method as claimed in claim 16, wherein the electrophotographic composition is a varnish composition that comprises the porous silica particles infused with the fragrance, and wherein electrophotographically printing the image onto the print substrate comprises electrophotographically printing a coloured image onto the print substrate using an electrophotographic ink composition, and electrophotographically printing the varnish composition onto the coloured image.

18. The method as claimed in claim 17, wherein the porous silica particles are particles of fumed silica.

19. The method as claimed in claim 18, wherein the polymer resin is a thermoplastic resin having acidic side groups.

20. A print substrate comprising an image formed from at least one layer of an electrophotographic composition printed onto the substrate, wherein the electrophotographic composition comprises a polymer resin and porous silica particles infused with a fragrance.

* * * * *

UNITED STATES PATENT AND TRADEMARK OFFICE
CERTIFICATE OF CORRECTION

PATENT NO.        : 10,394,154 B2                           Page 1 of 1
APPLICATION NO.   : 15/568867
DATED             : August 27, 2019
INVENTOR(S)       : Guy Nesher et al.

It is certified that error appears in the above-identified patent and that said Letters Patent is hereby corrected as shown below:

In the Claims

In Column 16, Line 6, in Claim 12, delete "claim 3," and insert -- claim 4, --, therefor.

Signed and Sealed this
Tenth Day of December, 2019

Andrei Iancu
*Director of the United States Patent and Trademark Office*